United States Patent
Lange et al.

(10) Patent No.: US 6,180,729 B1
(45) Date of Patent: Jan. 30, 2001

(54) CONTINUOUS GAS-PHASE POLYMERIZATION PROCESS

(75) Inventors: Armin Lange, Heidelberg; Wolfgang Micklitz, Neustadt; Rainer Karer, Kaiserslautern; Kaspar Evertz, Schifferstadt; Shahram Mihan, Ludwigshafen; Hans-Jacob Feindt, Limburgerhof; Manfred Hecker, Neustadt; Peter Bauer, Ludwigshafen; Philipp Rosendorfer, Neustadt, all of (DE)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/201,084

(22) Filed: Nov. 30, 1998

(30) Foreign Application Priority Data

Jan. 5, 1998 (DE) .............................. 198 00 020

(51) Int. Cl.$^7$ ..................................... C08F 2/40
(52) U.S. Cl. .................. 526/74; 526/82; 526/83; 526/84; 526/88; 526/89
(58) Field of Search .................. 526/104, 74, 79, 526/82, 83, 84, 85, 88, 89, 64

(56) References Cited

U.S. PATENT DOCUMENTS

| | | | |
|---|---|---|---|
| 4,764,056 | 8/1988 | Zentgraf et al. | 406/68 |
| 5,037,905 * | 8/1991 | Cummings et al. | 526/74 |
| 5,200,502 | 4/1993 | Kao et al. | 528/494 |
| 5,414,064 | 5/1995 | Lux et al. | 526/215 |
| 5,625,012 | 4/1997 | Hussein et al. | 526/74 |

FOREIGN PATENT DOCUMENTS

| | | |
|---|---|---|
| 89 691 | 9/1983 | (EP) . |
| 301 872 | 2/1989 | (EP) . |
| 359444 | 3/1990 | (EP) . |
| 376 559 | 7/1990 | (EP) . |
| 0 359 444 B1 * | 9/1990 | (EP) . |
| 449519 | 10/1991 | (EP) . |
| 471 497 | 2/1992 | (EP) . |
| 571 826 | 12/1993 | (EP) . |
| 475 603 | 12/1995 | (EP) . |
| 0 449 519 A2 * | 10/1997 | (EP) . |
| 811638 | 12/1997 | (EP) . |

* cited by examiner

*Primary Examiner*—David Wu
*Assistant Examiner*—R. Harlan
(74) *Attorney, Agent, or Firm*—Keil & Weinkauf

(57) ABSTRACT

In a continuous gas-phase polymerization process for preparing ethylene and propene homopolymers and copolymers, in which ethylene, propene or a mixture of ethylene or propene and $C_3$–$C_8$-α-monoolefins is polymerized in the polymerization zone of a gas-phase polymerization reactor at from 30 to 125° C. and a pressure of from 1 to 100 bar in the gas phase in a bed of finely divided polymer in the presence of a catalyst, where the reactor gas is circulated to remove the heat of polymerization, polymer deposits in the circulating gas line are prevented by metering a catalyst poison having a boiling point above the maximum temperature within the circulating gas line into this circulating gas line in at most such an amount that it does not significantly impair the productivity of the catalyst in the reactor.

6 Claims, No Drawings

CONTINUOUS GAS-PHASE POLYMERIZATION PROCESS

The present invention relates to a continuous gas-phase polymerization process for preparing ethylene and propene homopolymers and copolymers, in which ethylene, propene or a mixture of ethylene or propene and $C_3$–$C_8$-α-monoolefins is polymerized in the polymerization zone of a gas-phase polymerization reactor at from 30 to 125° C. and a pressure of from 1 to 100 bar in the gas phase in a bed of finely divided polymer in the presence of a catalyst, where the reactor gas is circulated to remove the heat of polymerization.

The invention further relates to the use of catalyst poisons as means of preventing deposits in the circulating gas line of gas-phase polymerization plants.

Gas-phase polymerization processes are economical processes for the polymerization of ethylene and propene or for the copolymerization of ethylene or propene with $C_3$–$C_8$-α-olefins. Such gas-phase polymerization processes can be configured either as gas-phase fluidized-bed processes or as stirred gas-phase processes. Said processes are described, for example, in EP-A-0 475 603, EP-A-0 089 691 and EP-A-0 571 826.

It is characteristic of gas-phase fluidized-bed processes that the bed of polymerizing polymer particles is kept in a fluidized state by introduction of a gas mixture from below. In addition, the heat of polymerization liberated is removed from the reactor by this gas. The reaction gas is cooled in a heat exchanger located outside the reactor and is recirculated to the reactor through a gas distribution plate (circulating gas).

However, the circulating gas carries a certain amount of finely divided polymer from the reactor and into the circulating gas system. These polymer particles contain active catalyst and can thus continue to polymerize in the circulating gas system. If these particles precipitate in the circulating gas system, deposits and accumulations can be formed at these places. On the one hand, these deposits can themselves cause malfunctions (blocking of the cooler, conglutinations at the compressor) and, on the other hand, pieces of these deposits can also become detached again. This is undesirable from two points of view. The detached deposits can quickly block the holes of the gas distribution plate of the reactor and thus require shutdown and costly cleaning. If such pieces of deposit get through the gas distribution plate into the reactor, the product quality is impaired by these particles: specks are formed. Particularly in the case of products for film applications, this can lead to out-of-specification material.

Past attempts to solve this problem were primarily based on reducing the amount of fine polymer dust in the circulating gas. For this reason, many fluidized-bed plants include a cyclone downstream of the reactor outlet to remove this reactive fine dust. However, this cyclone represents a considerable outlay in terms of apparatus and its efficiency in removing very fine dusts, which, however, often contain a very high proportion of catalyst, is often unsatisfactory.

The use of catalyst poisons in gas-phase fluidized-bed polymerizations is already known. Thus, catalyst poisons are used, for example, to stop polymerizations (e.g. in the case of a polymerization reaction which has run out of control, see, for example, EP-A-0 471 497) or for the fine regulation of catalyst activity (see, for example, EP-A-359 444 or EP-A-376 559). However, in continuous processes, volatile compounds, generally gases such as $CO_2$, CO or $O_2$, are always used because their site of action is believed to be primarily in the reactor and a uniform distribution in the reactor chamber is desirable. These agents are generally unsuitable for targeted inactivation of catalyst-containing fine dusts in the circulating gas line, since they have a considerable influence on the polymerization reaction in the reactor.

It is an object of the present invention to find a way of preventing the formation of polymer deposits in the circulating gas line of gas-phase polymerization reactors without use of complicated apparatus, to increase the running time of such plants and to improve the quality of the polymerization products.

We have found that this object is achieved by a continuous gas-phase polymerization process for preparing ethylene and propene homopolymers and copolymers, in which ethylene, propene or a mixture of ethylene or propene and $C_3$–$C_8$-α-monoolefins is polymerized in the polymerization zone of a gas-phase polymerization reactor at from 30 to 125° C. and a pressure of from 1 to 100 bar in the gas phase in a bed of finely divided polymer in the presence of a catalyst, where the reactor gas is circulated to remove the heat of polymerization, wherein, to prevent polymer deposits in the circulating gas line, a catalyst poison having a boiling point above the maximum temperature within the circulating gas line is metered into this circulating gas line in at most such an amount that it does not significantly impair the productivity of the catalyst in the reactor.

Furthermore, we have found the use of such catalyst poisons as means of preventing deposits in the circulating gas line of gas-phase polymerization plants.

The process of the present invention can be carried out in a gas-phase fluidized-bed reactor as is described in detail, for example, in EP-A-0 475 603, EP-A-0 089 691 or EP-A-0 571 826, or in a gas-phase stirred reactor. The following description relates predominantly to gas-phase fluidlized-bed processes, but can also be applied analogously to stirred gas-phase polymerization processes. In general, the gas-phase fluidized-bed reactor is a more or less long tube through which circulated reactor gas flows. In general, the circulated reactor gas is fed in at the lower end of the gas-phase fluidized-bed reactor and is taken out again at its upper end. The circulated reactor gas is usually a mixture of ethylene or propene, if desired a molecular weight regulator such as hydrogen and inert gases such as nitrogen and/or saturated hydrocarbons such as ethane, butane or hexane. The reactor gas can further comprise $C_3$–$C_8$-α-monoolefins such as propene, 1-butene, 1-pentene, 2-methylpentene, 1-hexene, 1-heptene and 1-octene as comonomers. Preference is given to a process in which ethylene is copolymerized with 1-hexene. The flow rate of the reactor gas has to be sufficiently high, on the one hand, to fluidize the bed of mixed, finely divided polymer which is located in the tube and serves as polymerization zone and, on the other hand, to effectively remove the heat of polymerization.

To set constant reaction conditions, the constituents of the reactor gas can be fed into the gas-phase fluidized-bed reactor directly or via the circulated reactor gas. In the process of the present invention, it is advantageous to introduce the catalyst directly into the fluidized bed. It has been found to be particularly advantageous to meter the catalyst a little at a time together with nitrogen or argon directly into the bed of material, using the method described in DE-A-35 44 915.

In order to prevent finely divided polymer being carried from the polymerization zone into the circulating gas system, the gas-phase fluidized-bed reactor used for the process of the present invention has, at its upper end, a widened-diameter calming zone which reduces the velocity of circulating gas. In general, it is advisable to reduce the circulating gas velocity in this calming zone to from one third to one sixth of the circulating gas velocity in the polymerization zone.

After leaving the gas-phase fluidized-bed reactor, the circulated reactor gas is fed to a circulating gas compressor and a circulating gas cooler. These equipment items may be installed in either order. The cooled and compressed circulating gas is then passed via a customary and known gas distribution plate back into the mixed bed of material in the gas-phase fluidized-bed reactor. This results in an extremely homogeneous gas distribution which ensures good mixing of the bed of material.

In the process of the present invention too, the ratios of the starting materials, but in particular the ratio of ethylene to $C_3$–$C_8$-α-monoolefins, determine the density of the resulting copolymers.

Furthermore, the amount of catalyst metered in determines the product output of the gas-phase fluidized-bed reactor. Its capacity is, as is known, limited by the cooling capacity for the circulated reactor gas. This cooling capacity depends, on the one hand, on the pressure of the reactor gas or at which the (co)polymerization is carried out. It is generally advisable to work at pressures of from 1 to 100 bar, preferable from 10 to 80 bar and in particular from 15 to 50 bar. In addition, the cooling capacity depends on the temperature at which the (co)polymerization in the fluidized bed is carried out. In the process of the present invention, it is advantageous to work at temperatures of from 30 to 125° C., particularly preferably from 70 to 115° C. For copolymers of relatively high density, preference is given to setting the temperature in the upper part of this range, while for copolymers of lower density, preference is given to setting the temperature in the lower part of this range.

Apart from the temperature, the proportion of inert gases such as nitrogen or hydrocarbons also has an influence on the risk of conglutinations and deposits occurring. High proportions of inert gas can reduce the risk of deposits, but can at the same time also adversely affect the space-time yield, so that the process can become uneconomical. According to the process of the present invention, the proportion of inert gas is preferably from 25 to 55% by volume, particularly preferably from 35 to 50% by volume, based on the total volume of the reaction gas.

Suitable catalysts are all known catalysts which are customarily used for ethylene and propene (co)polymerization, for example Ziegler-Natta catalysts, chromium catalysts or metallocene catalysts. These catalysts, including necessary or advantageous cocatalysts and activators, are known to those skilled in the art. In general, these catalysts are used in supported form, for example on support materials such as inorganic oxides (e.g. MgO or silica gel) or organic polymers (e.g. polyethylene particles).

As catalyst poisons which are used according to the present invention, it is possible to use all compounds which have a boiling point above the maximum temperature within the circulating gas line. These catalyst poisons can be of quite different chemical nature. It is important that, on the one hand, they have a low vapor pressure at the temperatures prevailing in the circulating gas line and at the inlet orifices of the bottom of the reactor and that, on the other hand, they bear functional groups which coordinate more strongly to the active centers of the catalyst metal atoms than does ethylene and thus irreversibly (if possible) inhibit the catalyst. The first requirement, i.e. the low vapor pressure, depends primarily on the molecular weight, so that, for example, oligomeric and polymeric substances having suitable functional groups display good effectiveness. Well suited catalyst poisons for the purposes of the present invention generally have a molecular weight of over 100, preferably over 150 and particularly preferably over 200.

As regards the second requirement, that of suitable functional groups, preference is given to a process in which the catalyst poison metered in is a compound or a mixture of compounds containing at least one of the functional groups —$NR_2$, —NR—, —OR, —O—, =O, —OS, —S— and =S, where R is hydrogen or an alkyl radical having from 1 to 8 carbon atoms. Particularly suitable compounds are those which bear a plurality of such functional groups, with these groups being able to be identical or different.

As radicals R, preference is given to hydrogen, but alkyl radicals such as methyl, ethyl, propyl, isopropyl and butyl and also various $C_5$–$C_8$-alkyl radicals are also suitable, with preference being given to methyl and ethyl.

Preference is given to using catalyst poisons which have a vapor pressure at 20° C. of less than 10 000 Pa, particularly preferably less than 2000 Pa and very particularly preferably less than 1000 Pa. Particular mention may be made, for example, of the commercially available alkylamino ethoxylate Atmer 163 (manufactured by ICI).

The amount of catalyst poison to be metered in cannot be specified in general terms, but depends on the poison, the catalyst or cocatalyst system, the occurrence of fine dust and the reaction conditions. It is necessary to determine the optimum amount experimentally. For this purpose, it is advantageous to gradually increase the amount of catalyst poison until an effect on the catalyst productivity becomes noticeable and then again reduce the amount a little. Since the exact amount of fine dust to be deactivated is not known, the catalyst poison can, as an approximation, be metered into the circulating gas line in an amount of about 0.4 ppm, based on the product output.

The catalyst poison can be metered into the circulating gas line in pure form or, preferably, in diluted form, most preferably in dissolved form. Suitable diluents are all materials which are compatible with the polymerization process. It has been found to be particularly advantageous to employ a process in which the catalyst poison is fed into the circulating gas line as a solution in a $C_3$–$C_8$-α-monoolefin. The respective comonomer is, of course, generally used.

In one embodiment of the process of the present invention, the catalyst poison is fed into the circulating gas line together with a surface-active compound. Surface-active substances which can be used are, for example, fatty alcohol ethoxylates, polyalkylene glycols or ethylene oxide-propylene oxide block copolymers. Further suitable compounds are known to those skilled in the art. The surface-active substances increase the wettability of the fine dust by the catalyst poison liquid and thus improve the effectiveness of the catalyst poisons.

Another advantageous embodiment is one in which the catalyst poison is fed into the circulating gas line at a point downstream of the reactor but upstream of the cooler and the compressor.

The use according to the present invention of catalyst poisons for preventing deposits in the circulating gas line of gas-phase fluidized-bed polymerization plants makes it possible to significantly increase the running time of such plants without adversely affecting the productivity of the catalyst.

EXAMPLES

The following examples illustrate the action of a catalyst poison of low volatility metered into the circulating gas line in the preparation of an MDPE film product (ethylene-1-hexene copolymer, density 0.937 g/cm³, melt flow index MFI (21.6/190° C.) 12–14 g/10 min) using a chromium catalyst (silica gel support, 0.2% by weight of chromium) in a gas-phase fluidized-bed process.

The catalyst poison employed was ATMER 163 (manufacturer: ICI), a commercially available alkylamino ethoxylate. The vapor pressure of the compound at 20° C. is 600 Pa.

Example 1

In a production reactor, the above-described MDPE film product was prepared at an output of 7.5 tons/h and a reactor pressure of 21 bar. A solution of Atmer 163 in 1-hexene was metered into the circulating gas line immediately downstream of the entry of the reactor gas. For this purpose the ATMER 163 was predissolved in 1-hexene (concentration: 0.2% by weight) and then metered into the circulating gas line via a nozzle together with the 1-hexene required for the preparation of the ethylene-1-hexene copolymer. The amount of ATMER 163 metered in was 3 g/h. Based on the reactor output, this corresponds to an amount of 0.4 ppm. The productivity of the catalyst did not change as a result of this addition and was 9000 g of polymer/g of catalyst at a mean residence time of 3.0 h.

Even after a polymerization time of 3 months, the differential pressure at the distributor plate did not rise significantly. The film quality did not deteriorate during the entire run.

Comparative Example C1

In a production reactor, the above-described MDPE film product was prepared at an output of 7.5 tons/h and a reactor pressure of 21 bar. The productivity of the catalyst was 9000 g of polymer/g of catalyst at a residence time of 3.0 h. After a polymerization time of about 4 weeks, the differential pressure at the distributor plate increased so much that the reactor had to be shut down. Deposits had formed within the circulating gas line and pieces of these deposits had blocked the openings of the gas distributor plate. The film quality had deteriorated during the run. Some batches were outside the specification for speck assessment.

Example 2

To demonstrate the effect of metering volatile (not according to the present invention, Comparative Example C2) and relatively nonvolatile (according to the present invention) catalyst poisons into the circulating gas line, polymerizations were carried out in a pilot plant reactor (reactor diameter: 0.5 m, length of the reaction zone: 4.40 m, product output: about 50 kg/h).

As a further Comparative Experiment C3, the polymerization was carried out without any addition of catalyst poison. Metering-in of ATMER 163: 0.2% by weight predissolved in hexene, metered into the circulating gas line together with the 1-hexene required for the polymerization.

For the Comparative Experiment C2, $O_2$ diluted with nitrogen was metered into the circulating gas line.

The results are shown in Table 1:

TABLE 1

Effect of nonvolatile and volatile catalyst poisons

| Ex. | Catalyst poison | Catalyst productivity [g of polymer/g of catalyst] | Bulk density [g/l] | MFI (21.6/190° C.) [g/10 min] |
| --- | --- | --- | --- | --- |
| 2 | 0.4 ppm Atmer 163 | 4400 | 500 | 13.5 |
| C2 | 0.4 ppm $O_2$ | 2700 | 385 | 17.5 |
| C3 | — | 4400 | 500 | 13.0 |

We claim:

1. A continuous gas-phase polymerization process for preparing ethylene and propene homopolymers and copolymers, in which ethylene, propene or a mixture of ethylene or propene and $C_3$–$C_8$-α-monoolefins is polymerized in the polymerization zone of a gas-phase polymerization reactor at from 30 to 125° C. and a pressure of from 1 to 100 bar in the gas phase in a bed of finely divided polymer in the presence of a catalyst, wherein the reactor gas is circulated to remove the heat of polymerization, wherein, to prevent polymer deposits in the circulating gas line, a catalyst poison which is an alkylamino ethoxylate having a boiling point above the maximum temperature within the circulating gas line is metered into the circulating gas line in an amount that does not significantly impair the productivity of the catalyst in the reactor.

2. A continuous gas-phase polymerization process as claimed in claim 1, wherein the polymerization is carried out in a fluidized-bed reactor.

3. A continuous gas-phase polymerization process as claimed in claim 1, wherein said catalyst poison is fed into the circulating gas line as a solution in a $C_3$–$C_8$-α-monoolefin.

4. A continuous gas-phase polymerization process as claimed in claim 1, wherein said catalyst poison is fed into the circulating gas line together with a surface-active compound.

5. A continuous gas-phase polymerization process as claimed in claim 1, wherein said catalyst poison is fed into the circulating gas line at a position downstream of the reactor but upstream of the cooler and the compressor.

6. A process for using an alkylamino ethoxylate, as a catalyst poison to prevent deposits in the circulating gas line of gas-phase polymerization plants which comprises adding said alkylamino ethoxylate to said circulating gas line.

* * * * *